United States Patent [19]
Mosher et al.

[11] Patent Number: 6,029,143
[45] Date of Patent: Feb. 22, 2000

[54] WIRELESS COMMUNICATION PRODUCT FULFILLMENT SYSTEM

[75] Inventors: Michael S. Mosher, Carmel, Ind.; David L. R. Howard, Rochester Hills, Mich.

[73] Assignee: Brightpoint, Inc., Indianapolis, Ind.

[21] Appl. No.: 08/871,873

[22] Filed: Jun. 6, 1997

[51] Int. Cl.[7] .................................................. G06F 17/60
[52] U.S. Cl. ............................ 705/28; 705/29; 705/34; 364/468.01; 364/468.05
[58] Field of Search .................................. 705/28, 22, 7, 705/29, 8, 34, 39, 40; 364/468.01, 468.05; 455/419, 409

[56] References Cited

U.S. PATENT DOCUMENTS

| | | | |
|---|---|---|---|
| 4,459,663 | 7/1984 | Dye | 705/29 |
| 5,442,545 | 8/1995 | Matsui et al. | 705/29 |
| 5,450,317 | 9/1995 | Lu et al. | 705/10 |
| 5,463,555 | 10/1995 | Ward et al. | 364/468.01 |
| 5,485,369 | 1/1996 | Nicholls et al. | 705/9 |
| 5,603,084 | 2/1997 | Henry, Jr. et al. | 455/419 |
| 5,758,329 | 5/1998 | Wojcik et al. | 705/28 |
| 5,777,876 | 7/1998 | Beauchesne | 364/468.01 |
| 5,787,000 | 7/1998 | Lilly et al. | 364/468.01 |

OTHER PUBLICATIONS

"MCI Launches Retail Technology Centers Through SAM's", Newsbytes News Network, Nov. 27, 1996.
"Acqisition: CellStar Sells Communications Centers to MCI", Edge, On & About AT&T, Dec. 2, 1996.
"Powetel Places Contracts With Siemens and Brightpoint", International Telecommunications Intelligence, Oct. 31, 1996.

*Primary Examiner*—Emanuel Todd Voelte
*Assistant Examiner*—George D. Morgan
*Attorney, Agent, or Firm*—Woodard, Emhardt, Naughton, Moriarty & McNett

[57] ABSTRACT

A wireless communication product fulfillment system is disclosed. This system includes a computerized management technique for maintaining inventory data, ordering data, assembly data, and shipping data regarding wireless communication product kits of different configurations. These kits may correspond to orders from agents of different wireless communication service providers. The kit configurations may each specify a different brand of wireless communication device, such as a wireless telephone or pager. The fulfillment system further facilitates efficient operation by direct electronic data interfacing with multiple ordering agents and wireless communication service carriers.

22 Claims, 6 Drawing Sheets

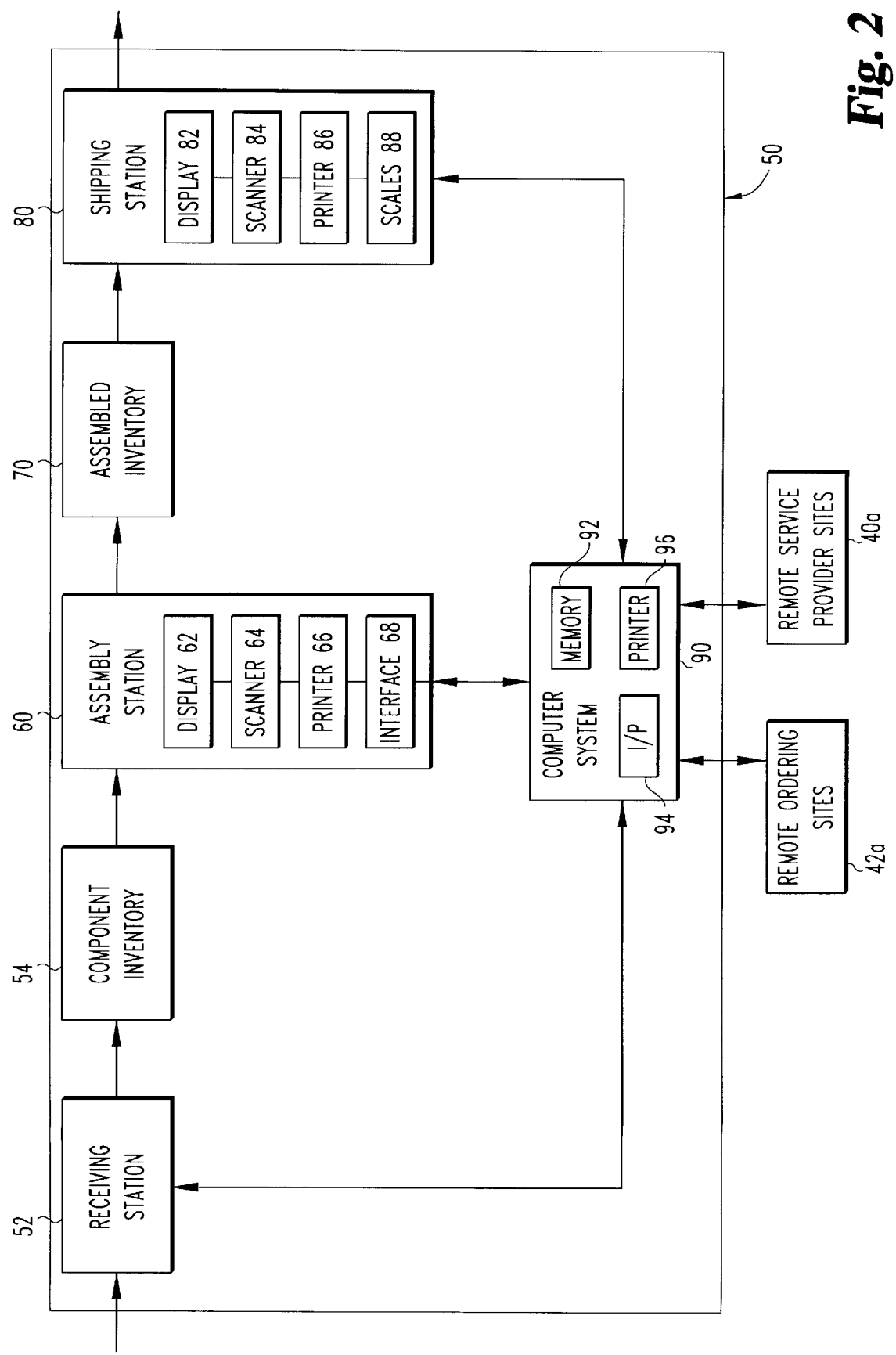

WIRELESS COMMUNICATION PRODUCT FULFILLMENT SYSTEM

MICROFICHE APPENDIX

A computer program listing in included herewith as a microfiche appendix with a total of 166 fiche sheets and 6479 frames.

BACKGROUND OF THE INVENTION

The present invention relates to distribution of wireless communication products and services.

The demand for wireless communication products and services has increased at an explosive rate in recent years. This burgeoning industry has made wireless cellular telephones and wireless paging devices commonplace. It is anticipated that an all digital Personal Communication Services standard—known as "PCS"—will step in as the next generation of wireless communication products.

Often, wireless communications present a somewhat complex dilemma for corresponding product and service providers. This dilemma arises from the need to supply a user equipment that is recognized by the service provider's system for activation, operation, and billing purposes. To meet this need, the equipment is ordinarily programmed or otherwise modified by the service provider or equipment manufacturer to have unique identifiers that link the equipment and user to the service provider. In addition, it is often desirable to package the equipment with other items, such as instructional materials, carrying cases, batteries, battery chargers, and sometimes service contracts. Unfortunately, package integration and inventory management by the service provider or equipment manufacturer often results in an unwieldy business arrangement that adds little benefit compared to the costs.

Thus, there is a need for a system to more effectively supply packaged wireless communication equipment and services. Preferably, this system accommodates multiple service providers and equipment manufacturers, and includes the programming and kitting needed to deliver a comprehensive wireless communication product to end users with a greater cost-benefit than conventional techniques. The present invention meets these needs and provides other important benefits and advantages.

SUMMARY OF THE INVENTION

The present invention relates to a fulfillment system for wireless communication products. Various aspects of the invention are novel, non-obvious, and provide various advantages. While the actual nature of the invention covered herein can only be determined with reference to the claims appended hereto, certain features which are characteristic of the preferred embodiment disclosed herein are described briefly as follows.

One feature of the present invention is a technique of wireless communication product fulfillment that includes a computer system operating to provide a number of databases each corresponding to one of at least three different wireless communication service providers. The databases each include component inventory data corresponding to each of the wireless communication service providers. Service provider data is received along an electronic communication channel established between the computer system and a remote site corresponding to one of the wireless communication service providers. This service provider data is directly received into the computer system and automatically configured for inclusion in a corresponding one of the databases. The service provider data is utilized to generate a number of kits. The kits each include one of a number of wireless telephones represented by the component inventory data for the one of the service providers.

In another feature of the present invention, wireless communication product fulfillment is provided by establishing a digital database for a wireless communication service provider in a memory of a computer system and maintaining inventory data corresponding to the wireless communication service provider in the database. The inventory data represents a number of wireless communication components including at least two different brands of wireless telephones. A first electronic communication channel is provided between the computer system and a remote site to transmit ordering data in a predetermined format from the remote site to the memory of the computer system. The computer system recognizes the predetermined format of the ordering data for an automatic transfer into the database. The ordering data corresponds to a number of orders for each of the brands of wireless telephones. A number of packages are assembled in accordance with information provided by the computer system. The packages each include one of the brands of wireless telephones. This assembly includes providing a number in the database uniquely associated with each of the wireless telephones being packaged to facilitate activation by the wireless communication service provider. The packages are shipped in accordance with the orders which includes updating the database to indicate shipment.

In still another feature, a fulfillment system is provided for processing a number of different groups of wireless communication components. The groups each include a number of wireless telephones and are associated with a different one of a number of wireless communication service providers. The system includes a computer with a number of databases each corresponding to one of the wireless communication service providers. The databases each include inventory data corresponding to the groups of wireless communication components. The computer selectively establishes an electronic communication channel with one of the wireless communication service providers to receive service provider data in a predetermined format from a corresponding remote site into the computer. The computer detects the predetermined format and provides the service provider data to a corresponding one of the databases. The computer also generates an output signal as a function of the inventory data and the service provider data. An assembly station with an output device and an input device operatively coupled to the computer responds to the output signal to provide information for assembly of a wireless communication kit package. The package includes a wireless telephone from a corresponding one of the groups. The input device selectively generates an input signal corresponding to an identifier to uniquely identify the wireless communication kit package. The computer responds to the input signal to update assembled package data in a corresponding one of the databases.

In a further feature, a system for fulfillment of orders for wireless communications is provided by a computer programmed with a first means for maintaining inventory control over a number of wireless communication kit components for a number of different wireless communication service providers. At least a portion of the components are provided by different wireless communication device manufacturers. The computer is also programmed with a second means for electronically receiving orders from a number of ordering agents each associated with a different one of the wireless communication service providers. In addition, programming of the computer includes a third means for directing assembly of different wireless component kit configurations in accordance with the orders. This third means provides for the entry of data corresponding to each of the kit configurations. Furthermore, the computer is programmed with a fourth means of automatically reporting inventory status, orders status, and assembly status to each of the wireless communication service providers to update switching software.

Accordingly, it is one object of the present invention to provide a wireless communication product fulfillment system.

It is another object of the present invention to provide a computerized technique for managing and assembling multiple wireless communication product kit configurations for a wireless communication service provider through automated data exchanges.

It is still another object of the present invention to provide a technique for managing kit assembly and packaging of various kit configurations for different wireless service communication providers that include different brands and types of wireless communication devices.

In yet another object, data is electronically transmitted to and from a fulfillment center without the need to re-key data or otherwise manually intervene to facilitate activation of wireless telephones for multiple service providers in a timely and cost-effective manner.

Further objects, features, advantages, benefits, and aspects of the present invention shall become apparent from the detailed drawings and descriptions provided herein.

BRIEF DESCRIPTION OF THE DRAWINGS

FIG. 2 is a schematic block diagram showing selected aspects of the system of FIG. 1 in greater detail.

DESCRIPTION OF THE PREFERRED EMBODIMENT

Figure 1:
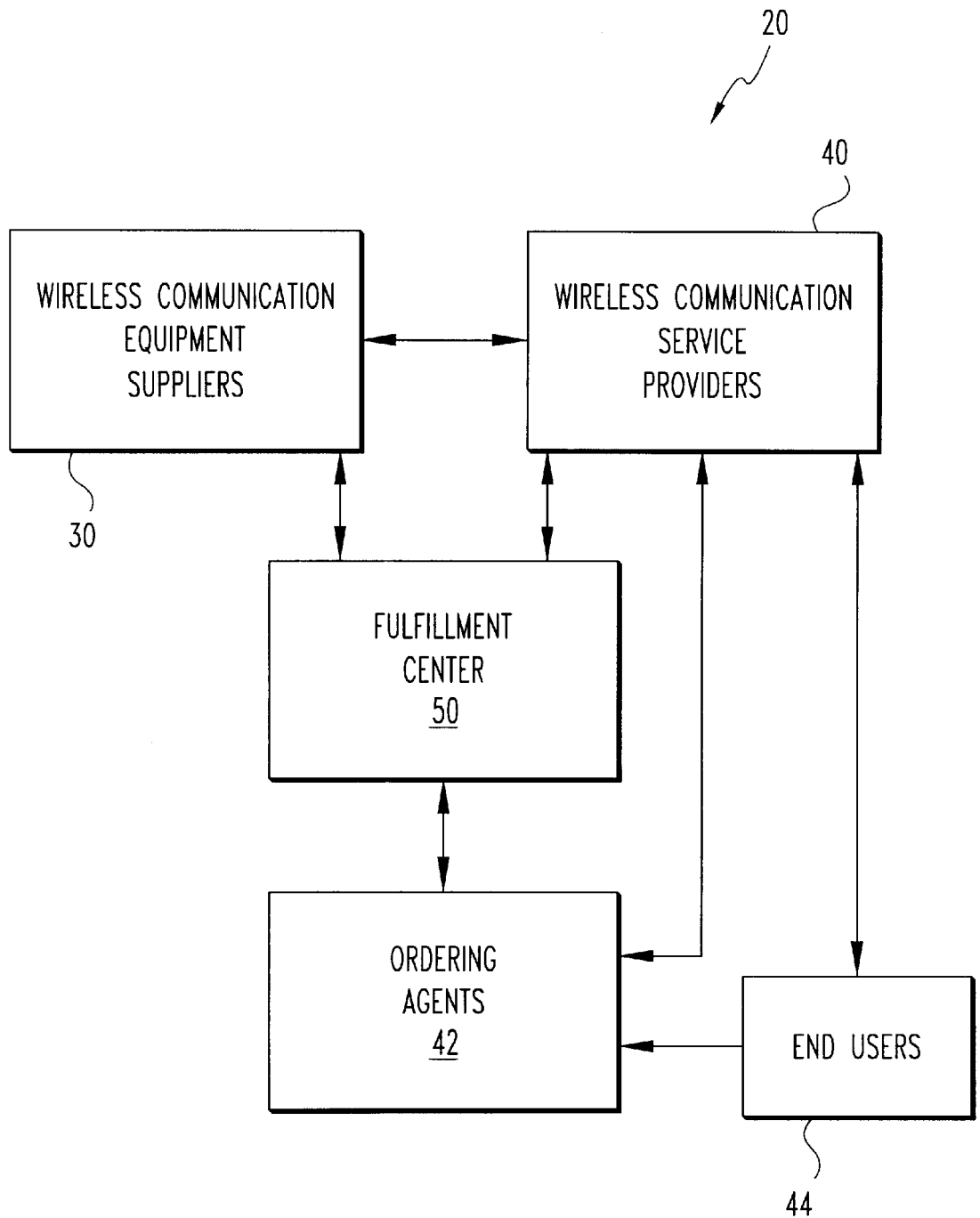
FIG. 1 is a schematic block diagram of a fulfillment system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiment, and any further applications of the principles of the invention as described herein are contemplated as would normally occur to one skilled in the art to which the invention relates.

FIG. 1 depicts fulfillment system 20 of the present invention. In FIG. 1, the interconnecting arrows indicate a pathway for the flow of material or information. These pathways are more fully discussed in connection with FIGS. 2 and 3a–3e.

System 20 includes a number of wireless communication equipment suppliers 30. Wireless communication equipment suppliers 30 are generally manufacturers of primary wireless communication devices such as wireless telephones and pagers. Equipment suppliers 30 may also provide batteries, battery chargers, and other accessories associated with these primary wireless communication devices. Equipment suppliers 30 may include competing manufacturers and suppliers remotely located with respect to each other, and are only designated by a single block for convenience in explaining system 20.

System 20 also includes wireless communication service providers 40. Service providers 40 may likewise be a collection of competing service providers geographically remote from one another. Service providers 40 supply the hardware, software, and other resources needed to implement a wireless communication network such as a cellular telephone or PCS communication system. Ordinarily, each wireless communication service provider 40 monitors usage and bills end users 44 of the wireless communication service accordingly.

Typically, a wire communication service provider 40 must have data specific to a primary wireless communication device being operated by a subscribing end user 44 in order to facilitate device activation and usage monitoring through a computerized Mobile Telephone Switch (MTS). Thus, special identifiers are needed to affiliate a given end user and corresponding wireless communication device with a given one of the wireless communication service providers 40. For example, a wireless telephone has at least two unique numbers associated with it to facilitate activation and operation. For a cellular system, these numbers include a Mobile Identification Number (MIN) and an Electronic Serial Number (ESN). The MIN is the actual phone number assigned by the service provider (sometimes called a service "carrier") and more than one may be loaded into a given handset. In contrast, the ESN is uniquely identified with the handset. The MIN/ESN combination is used to link the wireless telephone with a service provider 40. In the case of a PCS communication device, a handset typically has an International Mobile Equipment Identifier (IMEI) and an International Mobile Subscriber Identifier (IMSI). The IMSI is sometimes part of a Subscriber Identity Module (SIM) coupled with a PCS handset. Generally, before normal use of a wireless telephone can begin, the corresponding service provider's Mobile Telephone Switch (MTS) must be provided with the MIN/ESN (for cellular) or IMEI/IMSI (for PCS) number combinations.

Wireless communication service providers 40 typically purchase handsets and related accessories from wireless communication equipment suppliers to provide to subscribing end users 44. Generally, wire communication service providers 40 devise packages of the hardware and services that are sold or promoted as a wireless communication product. Ordinarily, one or more ordering agents 44 are affiliated with a given wireless communication service provider to promote these products to end users 44. Typically, ordering agents 42 make the initial contact with end users 44 which may later evolve into a direct contact between end users 44 and wireless communication service providers 40—such as results when end users 44 are billed by wireless communication service providers 40.

Fulfillment center 50 of system 20 interconnects wireless communication service equipment suppliers 30, wireless communication service providers 40, and ordering agents 42. Fulfillment center 50 offers a cost-effective computerized approach to packaging and kitting components to form wireless communication products, linking one or more wireless communication equipment suppliers 30 and automatically exchanging data necessary to use various communication devices with various wireless communication service providers 40. As a result, fulfillment center 50 frees the wireless communication equipment suppliers 30 and wireless communication service providers 40 from each having to maintain separate internal resources to provide integrated hardware and service products to the end users 44.

FIG. 2 depicts additional details about fulfillment center 50 with like numbers representing like features with respect to FIG. 1. Included within fulfillment center 50 is a receiving station 52 for receiving components from one or more wireless communication equipment suppliers 30. Accepted components flow from receiving station 52 to be stored in component inventory 54. Typically, wireless communication service providers 40 purchase components from one or more wireless communication equipment suppliers 30 which are then drop-shipped to fulfillment center 50. Preferably, separate component inventories 54 are maintained for each wireless communication service provider 40 for which fulfillment is being performed. Only one component inventory 54 is depicted in FIG. 2 to preserve clarity.

Material flows from component inventory 54 to assembly station 60. Assembly station 60 includes a computer workstation with various input and output devices. These output devices include display 62 and printer 66. The input devices include barcode scanner 64 and other input devices such as a keyboard and/or mouse (not shown) common to a conventional computer terminal arrangement. Assembly station 60 is configured to receive components from component inventory 54 to perform various kitting and packaging operations in accordance with information supplied via various output devices. Assembly station 60 is also configured to program wireless phones with wireless device interface 68.

Assembled products from assembly station 60 are assigned to assembly inventory 70. Preferably, a separate assembly inventory 70 is maintained for each wireless communication service provider 40 affiliated with fulfillment center 50. Assembly inventory 70 may correspond to a physical storage stage, or alternatively be utilized as a data tracking tool that need not correspond to an identifiable physical location. Assembled packages are forwarded to shipping station 80 either directly from station 60 or from a storage location. Shipping station 80 includes a workstation with display 82, label barcode scanner 84, printer 86, and weighing scale 88. These devices are configured to gather appropriate data from assembled packages being shipped and to otherwise facilitate the shipping process in an automated fashion. In one alternative embodiment, components may be assembled and shipped at a common station combining the features of stations 60 and 70.

Station 52, 60, and 80 are operatively coupled to computer system 90. Computer system 90 includes memory 92 in which data resides to manage various processes performed in association with fulfillment system 20. Preferably, memory 92 includes one or more components of the electronic (e.g. solid state), magnetic, or optical variety. Furthermore, Memory 92 may additionally or alternatively include an optical disk memory (CD), electromagnetic disk or tape media, or a combination of these. Also, memory 92 may be integrally associated with computer system 90, be remotely accessed via a communication link, or a combination of both.

Memory 92 of computer system 90 is preferably configured to retain a database for each service provider 40. This database includes tables and data structures needed to direct, track, and report various stages of the fulfillment process.

Computer system 90 also includes one or more conventional input devices (I/P) 94 and at least one printer 96. It is preferred that computer system 90 be of an appropriate digital configuration capable of accommodating anticipated data volume and executing software utilized to practice the present invention. This configuration includes communication interfaces suitable to automatically receive and transmit digital data with respect to remote sites in a timely and reliable manner. These remote sites include remote service provider sites 40a and remote ordering agent sites 42a. An electronic communication channel is selectively established with each remote site 40a, 42a to exchange data pertinent to fulfillment operations. Computer system 90 is configured with appropriate hardware and software to receive ordering data from sites 40a, 42a directly into memory 92. Furthermore, computer system 90 is configured to recognize predetermined formats of ordering data from sites 42a and service provider data from sites 40a for incorporation into appropriate database fields without manual data re-keying or operator manipulation of the data. Instead, any needed data translations are performed by the programming of computer system 90. This incorporation procedure may include routines programmed into computer system 90 to perform data content and structure compliance checking. In addition, operator input may be required to permit the transmission of data from one part of computer system 90 to another as a security measure; however, re-keying or otherwise manipulating incoming data is preferably avoided.

Computer system 90 also selectively provides one or more automated electronic data transmission channels to provide fulfillment data to service providers 40. This fulfillment data preferably is configured for use by various service providers to update switching software so that wireless communication devices, such as wireless telephones, are recognized. U.S. Pat. No. 5,603,084 to Henry, Jr., et al. and U.S. Pat. No. 5,484,369 9to Nicholls et al. are hereby incorporated by reference in their entirety to provide additional background information.

Figure 3A:
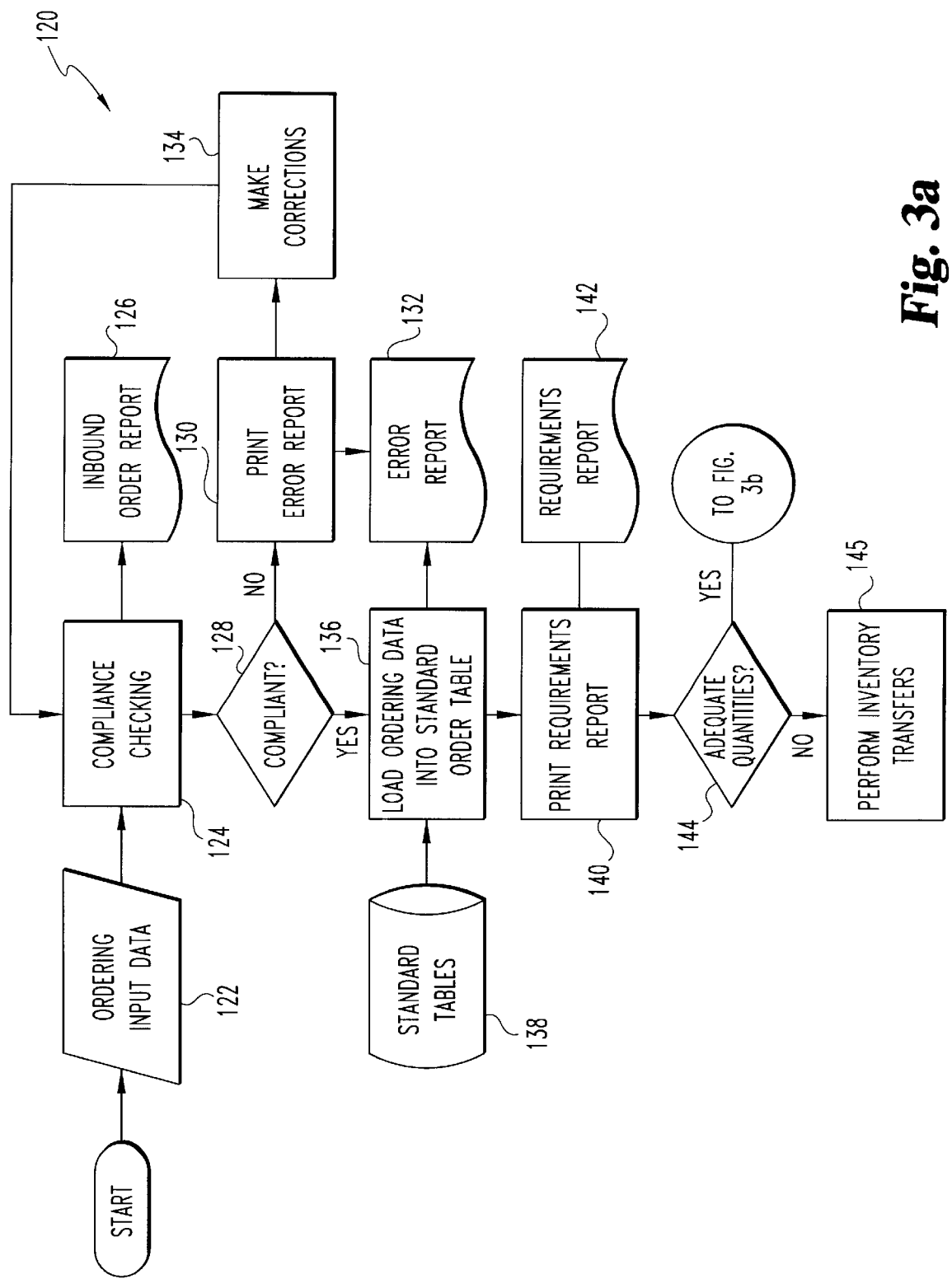
FIGS. 3a–3d are a flow chart depicting a process of the present invention performed with the system of FIG. 1.

The operation of fulfillment system 20 is further described in connection with fulfillment process 120 of FIGS. 3a–3d. Computer system 90 is preferably programmed with software to optimize performance and data management associated with various operations of process 120. Process 120 begins with ordering data input operation 122 as depicted in FIG. 3a. Computer system 90 receives ordering data that is configured for input in a predetermined format for storage directly in memory 92. For example, an Electronic Data Interchange (EDI) ANSI X.12 format may be employed with a predetermined arrangement of data fields. Alternatively, an ASCII file may be utilized with fields delineated by a pipe character, lines each terminated by carriage return/line feed characters, and file termination designated by an end-of-file character. Other formats and arrangements as would occur to those skilled in the art may also be utilized.

Ordering data generally corresponds to a table or data structure within a database residing in memory 92 for the corresponding wireless communication service provider 40. By way of non-limiting example, one or more fields in an ordering data table might include: (1) ordering agent identity and address information, (2) number and configuration of kit being ordered, (3) service plan identifier, (4) marketing information, (5) shipping address and contact, and (6) accounting information.

In one embodiment, ordering data is written by ordering agents 42 from remote sites 42a into a designated directory in memory 92 of computer system 90. Access to this directory is maintained by conventional communication software executed by system 90. Computer system 90 is programmed with a routine to check for compliance of the ordering data with predetermined standards in operation 124 before the ordering data is permitted to be incorporated into a service provider database. Operation 124 may include verification of the correct format and a cross-reference to expected data fields to assure that mandatory data fields and recognized identifiers are present. Compliance checking operation 124 provides a report of inbound ordering data in inbound order report 126. If the ordering data is not compliant as tested by conditional 128, an error report 132 is printed in operation 130 and corrections are attempted in operation 134. Compliance checking operation 124 is then performed again. Operation 124 may include input with device 194 to provide an acknowledgment, but does not require re-keying of data or other manual data manipulation.

If ordering data is compliant, then process 120 flows from conditional 128 to operation 136. In operation 136, computer system 90 is programmed to recognize the format of the ordering data and translate it, if necessary, to a standard electronic order format via tables 138. Problems with operation 136 are also provided in error report 132. Notably, even if an error does not occur, it is preferred that a verification report acknowledging receipt of ordering data be provided to the corresponding ordering agents 42 and/or affiliated wireless communication service provider 40.

After operation 136, an order requirements report 142 is provided by print operation 140. Typically, ordering data will specify one or more kits each including a wireless telephone. The ordering data may include a kit configured code, or specify contents directly. Ordinarily these kits also include instruction materials, packaging materials, a welcome letter, and possibly a service contract. In addition, various accessories may be included in the kit. The welcome letter is preferably customized by information derived from the ordering data such as explaining various aspects of the plan and or items associated with the kit. Preferably, the welcome letter is generated by a printer coupled to computer system 90 during kit assembly.

Conditional 144 tests whether an adequate quantity of components exist in the component inventory 54 for the given wireless communication service provider 40. If not, inventory transfers may be performed in operation 145 or the order is put "on hold" pending receipt of components from one or more corresponding wireless communication equipment suppliers 30.

Figure 3B:
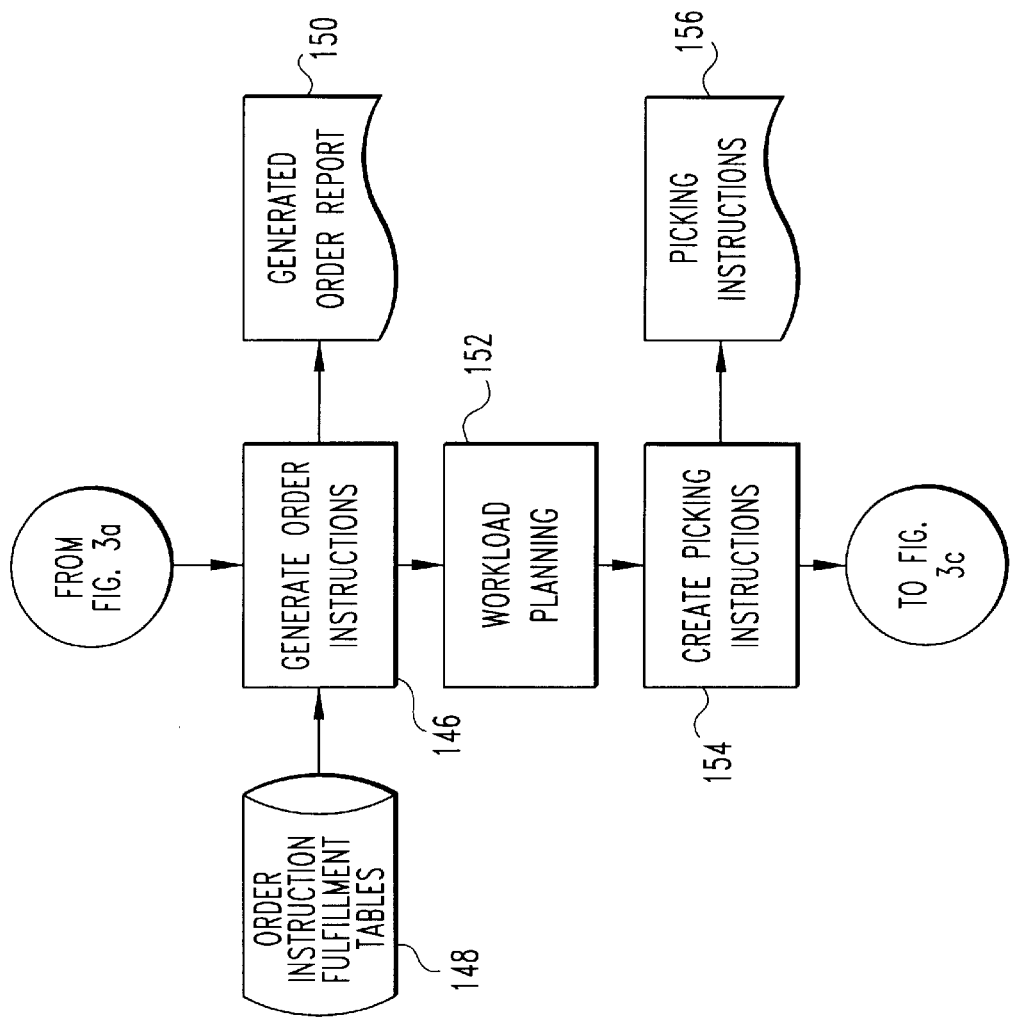

If adequate quantities are on hand, process 120 flows to operation 146 depicted in FIG. 3b. Operation 146 references internal order instructions corresponding to the kits specified in the ordering data. Operation 146 is performed as a function of the ordering data imported into a corresponding standard data table of computer system 90. Operator 146 also generates an order report 150 which is configured for transmission to a corresponding wireless communication service provider 40.

In operation 152, workload planning is performed. After operation 152, inventory picking instructions 156 are generated to direct selection of specified components from component inventory 54 for each kit corresponding to order instructions generated in operation 146. These picking instructions may be via printed paper ticket or provided as a Radio Frequency (RF) data communication to a remote unit used to direct component selection.

Figure 3C:
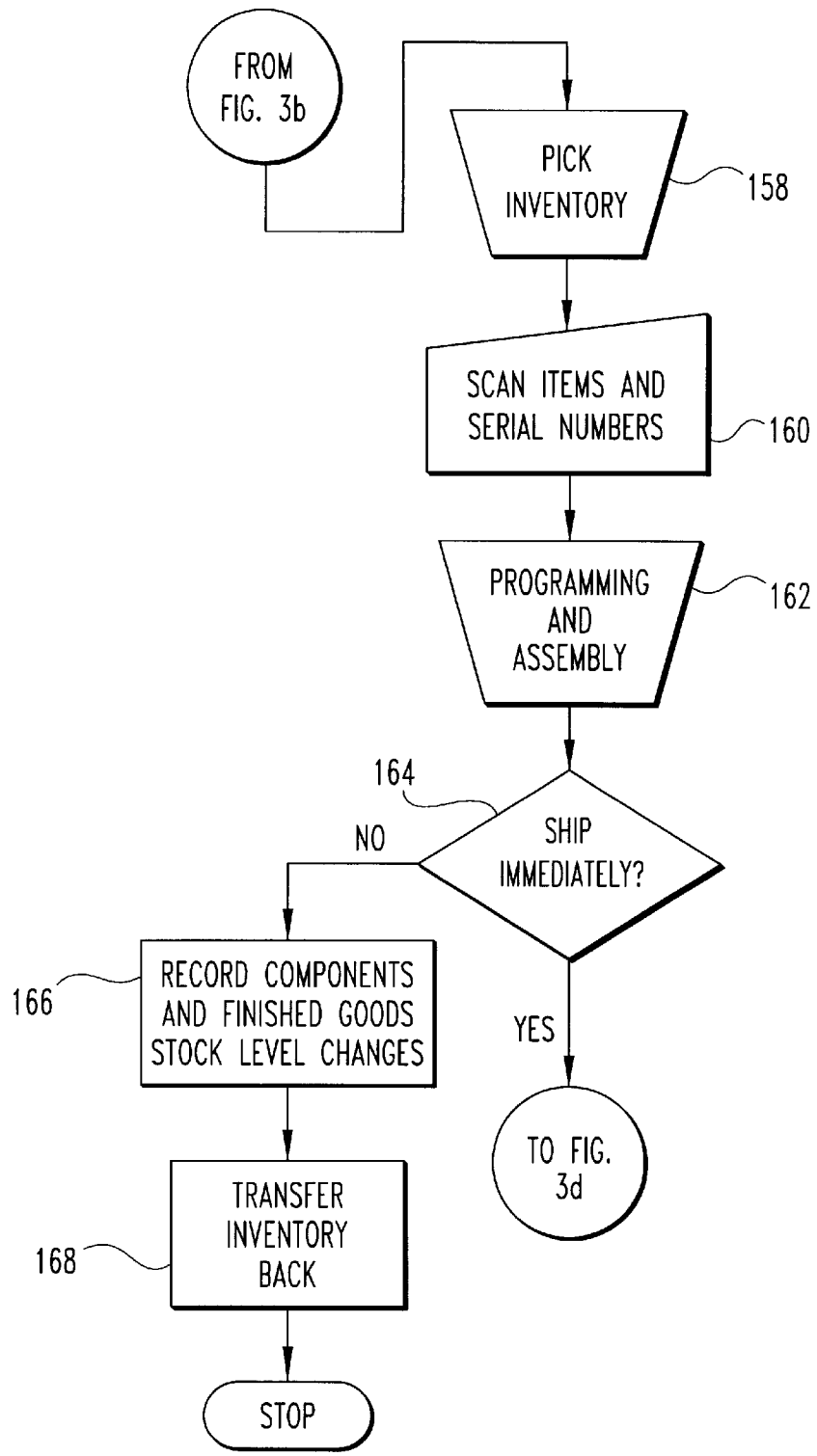

Process 120 then flows to operation 158 as depicted in FIG. 3c. Operation 158 corresponds to the physical selection of components by the worker from the relevant component inventory 54 in accordance with picking instructions 156 generated in operation 154. In input operation 160, the serial numbers of selected components are scanned into the relevant service provider database with the barcode scanner 64 at assembly station 60. Typically, a unique serial number identifying the kit number is assigned and scanned into the database, and a corresponding barcode label is associated with the kit. In this manner a unique serial number may be used to identify each kit and its serialized contents. This approach avoids ambiguous use of a handset serial number to identify both the handset and the kit.

In operation 162, any needed device programming, such as loading a Mobile Identification Number (MIN) into a cellular telephone, is performed with device interface 68. In addition, interface 68 may be used to test operation of a wireless telephone and reprogram a telephone. Generally, an operational program is loaded into a wireless handset at this stage to install a software upgrade provided by the manufacturer. Operation 162 may also include generation of a welcome letter and a contract for inclusion with the primary wireless communication devices.

Conditional 164 test whether the kit should be immediately shipped. Generally, kits with PCS handsets need not be shipped immediately—typically being "pre-kitted" without a specified shipping destination. For kits that are not shipped immediately, data records corresponding to the assembled goods and corresponding stock levels are recorded in the relevant database in output operation 166. The assembled kits are then transferred to assembled inventory 70 for storage in operation 168 until directions to ship the product are received (not shown).

Figure 3D:
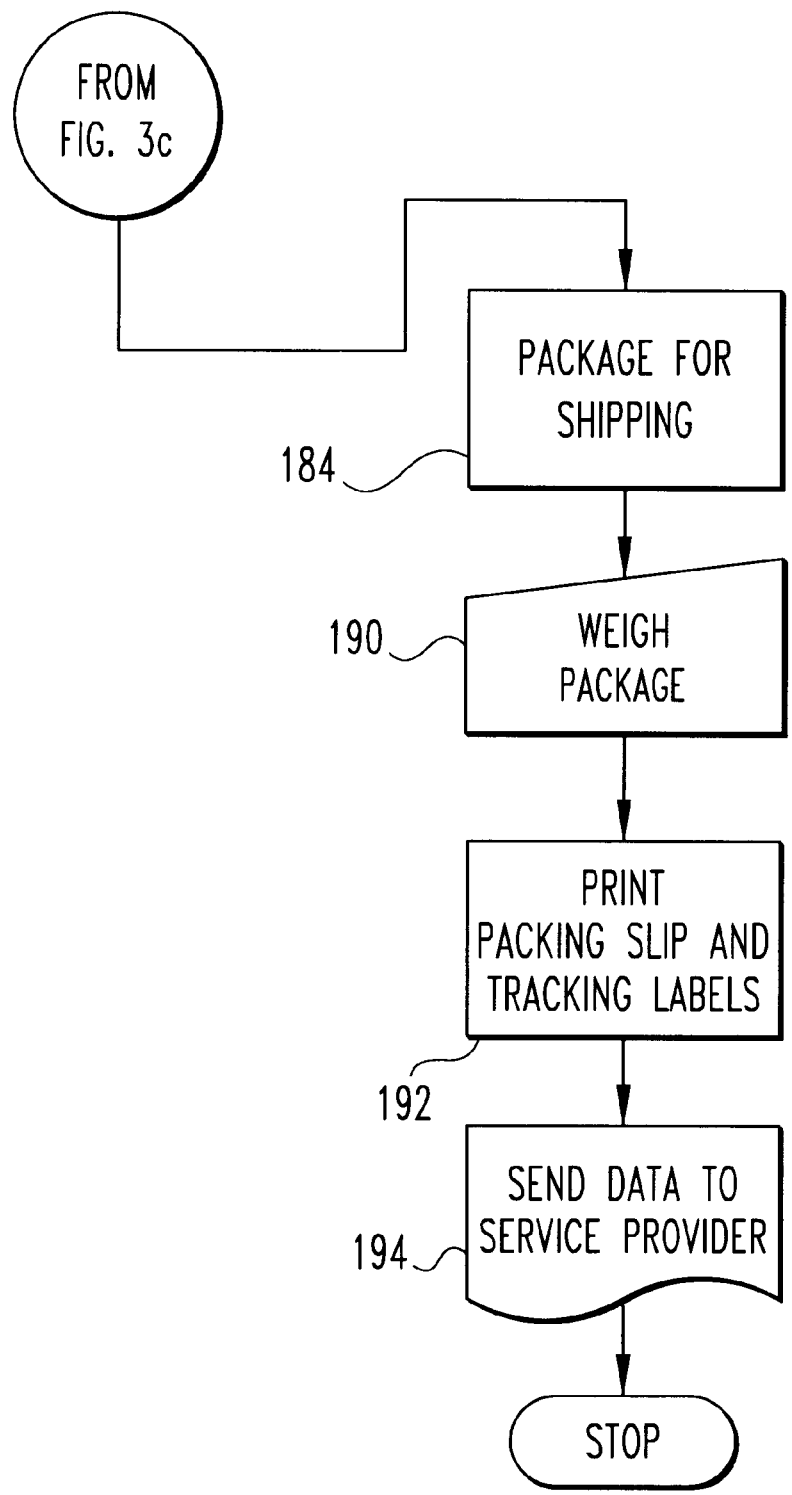

If the result of the conditional 164 determination is that immediate shipment is required, process 120 flows to operation 184 depicted in FIG. 3d. Immediate shipment is typical of kits containing a cellular telephone. In operation 184, the kit is packaged for shipping at shipping station 80. The resulting package is weighed in operation 190 with scales 88. It should be noted that in one embodiment, assembly station 60 and shipping station 80 are each along a continuous processing line to facilitate immediate shipment. A packing slip is printed in operation 192 with printer 86 at shipping station 80. Tracking labels, COD tags, and other identifiers may be provided as part of operation 192 to complete the package for shipping; and corresponding data is scanned or otherwise entered into the appropriate service provider database. Operations 184, 190, and 192 may also be utilized to ship kits stored in operation 168 once shipping directions are received for such kits.

Whether immediately shipped or shipped after storage as assembled goods, fulfillment processing information pertinent to shipping is collected in appropriate data fields of the relevant service provider database during process 120. In output operation 194, this fulfillment data is sent to the relevant service provider remote site 40a along with other reports generated by process 120. Preferably, data is sent in operation 194 during off-peak hours on a periodic basis to each respective wireless communication service provider 40 for which fulfillment has been performed; and as a minimum includes the information needed to modify the respective MTS, such as ESN/MIN combinations for cellular kits, and at least an IMEI for PCS kits. The fulfillment data transmitted in operation 194 may also provide other information, including but not limited to: (1) shipped kit/package configurations, quantities, and designated shipping destinations, (2) accounting information, (3) components purchased or received, (4) kit orders received, (5) orders on hold or otherwise in process, and (6) error or problem reports. Preferably, the data is electronically transferred by computer system 90 to the designated service providers in a format designed to optimize rapid updating of a designated Mobile Telephone Switch (MTS) so that wireless communication devices shipped through process 120 may be readily recognized and activated by the corresponding service provider. Consequently, process 120 provides a highly automated procedure for collecting, routing, and exchanging data between relevant parties of fulfillment system 20. This approach facilitates a rapid, cost-effective and high quality wireless communication product surpassing conventional paper-based manual data entry and manipulation techniques. In the preferred embodiment, multiple receiving stations 52, component inventories 54, assembly stations 60, assembly inventories 70, and shipping stations 80 are coupled to computer system 90 to accommodate the corresponding volume of fulfillment orders.

The Microfiche Appendix provided herewith provides a computer listing for one preferred embodiment of the present invention. This computer listing is for source code written in Informix Fourth Generation Language (4GL). In addition, the computer listing is configured to operate with the Informix ODS database server and Informix 4GL database platform software products available from Informix Software with a business address at 16011 College Blvd., Lenexa, KS 66219. This source code is configured to operate with the FourGen Enterprise Application Base inventory control software program which is also an Informix based software package. The FourGen software is available from Fourgen Software with a business address at 115 N.E. 100th Street, Seattle, Wash. 98125-8098.

Preferably, the source code of the computer listing is executed by a Sun ULTRA 6000 Sparc mainframe (the "Sun mainframe") as part of computer system 90. The Sun mainframe is available from VCSI with a business address at 8465 Keystone Crossing, Suite 210, Indianapolis, Ind. 46240. This system preferably utilizes the SUN Solaris 2.5.1 operating system.

In addition, for this preferred embodiment, computer system 90 further includes a number of personal computers executing a suitable terminal emulation program that are operatively coupled to the Sun mainframe by suitable networking hardware and software. Barcode scanners, thermal label printers, laser printers, and other corresponding input and output devices are integrated with the personal computers to provide the desired number of receiving stations 52, assembly stations 60, and shipping stations 80 for center 50. Preferably, data communication to and from remote sites such as ordering agent sites 42*a* and service provider sites 40*a* is provided using File Transfer Protocol/Internet Protocol (FTP/IP) via dedicated digital communication lines with transfer rates of at least 56 kbits. In alternative embodiments, different software and hardware arrangements are contemplated as would occur to those skilled in the art.

As used herein, it should be appreciated that: "variable," "criterion," "characteristic," "quantity," "amount," "value," "buffer," "constant," "flag," "data," "record," "memory space," "memory location," "threshold," "input," "output," "pixel," "image" (or a region thereof), "matrix," "command," "table," or "memory location" each generally correspond to one or more signals within processing equipment of the present invention.

It is contemplated that various operators, operations, stages, conditionals, procedures, thresholds, and processes described in connection with the present invention could be altered, rearranged, substituted, deleted, duplicated, combined, or added to other processes as would occur to those skilled in the art without departing from the spirit of the present invention.

All publications, patents, and patent applications cited in this specification are herein incorporated by reference as if each individual publication, patent, or patent application were specifically and individually indicated to be incorporated by reference and set forth in its entirety herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of wireless communication product fulfillment, comprising:

(a) establishing a digital database for a wireless communication service provider in a memory of a computer system;

(b) maintaining inventory corresponding to a number of wireless communication components including at least two different brands of wireless communication devices provided by at least two different suppliers, the inventory being represented by inventory data in the digital database for the wireless communication service provider;

(c) providing a first electronic communication channel between the computer system and a remote site to transmit ordering data corresponding to orders for each of the brands of wireless communication devices from one or more customers at the remote site, the ordering data being in a predetermined format for transmission into the memory of the computer system from the remote site, the computer system being configured to recognize the predetermined format of the ordering data for automatic transfer into the digital database;

(d) assembling a number of packages in accordance with the ordering data transmitted to the computer system, the packages each including one of the brands of wireless communication devices, said assembling including providing an identifier in the digital database uniquely associated with each of the wireless communication devices being packaged to facilitate activation by the wireless communication service provider; and (e) shipping the packages in accordance with the orders, said shipping including updating the digital database to indicate shipment.

2. The method of claim 1, wherein said assembling includes programming the wireless communication devices.

3. The method of claim 1, further comprising electronically reporting said shipping to the wireless communication service provider.

4. The method of claim 1, further comprising repeating said establishing, providing, assembling, and maintaining for each of a number of different wireless communication service providers.

5. The method of claim 1, further comprising generating a document for inclusion in each of the packages, the document being automatically customized in accordance with the ordering data.

6. The method of claim 1, wherein the computer system automatically translates the ordering data from the predetermined format into a format compatible with the digital database.

7. The method of claim 1, further comprising establishing a second electronic communication channel with the wireless communication service provider to import device programming data into the computer system.

8. The method of claim 1, further comprising electronically transmitting fulfillment data to the wireless communication service provider to facilitate activation of the wireless communication devices.

9. The method of claim 1, wherein the inventory and the computer system are provided in a fulfillment center located separately from the remote site and the wireless communication service provider and said assembling is performed at the fulfillment center.

10. The method of claim 1, further comprising:
    establishing a second electronic communication channel with the wireless communication service provider to import device programming data into the computer system; and
    electronically transmitting fulfillment data to the wireless communication service provider to facilitate activation of the wireless communication devices assembled in the packages.

11. A wireless telephone product fulfillment method, comprising:
    (a) operating a computer system to provide a number of databases each corresponding to one of at least three different wireless telephone service providers, the databases each including component inventory data for a respective one of the wireless telephone service providers, the inventory data for each database representing a number of wireless telephones from one or more suppliers;
    (b) receiving wireless telephone service provider data along a first electronic communication channel established between the computer system and a first remote site corresponding to a first one of the wireless telephone service providers, the wireless telephone service provider data being directly received into the computer system from the first one of the wireless telephone service providers for importation into a corresponding one of the databases;
    (c) utilizing the wireless telephone service provider data to generate a number of kits, the kits each including one of a number of wireless telephones represented by the component inventory data for the first one of the wireless telephone service providers; and
    (d) shipping the kits to one or-more customers of the first one of the wireless telephone service providers at a second remote site different from the first remote site.

12. The method of claim 11, wherein the wireless telephone service provider data includes at least one identifier to be loaded into each of the wireless telephones during said utilizing.

13. The method of claim 11, wherein the wireless telephone service provider data includes ordering information specifying the kits.

14. The method for claim 11, wherein each of the kits includes a number of items each having a serial number, and further comprising:
    (e) recording the serial number for each of the items in the database corresponding to the one wireless communication service provider; and
    (f) assigning a serial number representative of each of the kits.

15. The method of claim 11, further comprising automatically electronically reporting fulfillment data to the first one of the wireless telephone service providers for activation of the wireless telephones, the fulfillment data including an identifier for each of the wireless telephones.

16. The method of claim 11, further comprising generating a document for inclusion in each of the kits, the document being automatically customized in accordance with the service provider data.

17. The method of claim 11, wherein the computer system is located at a fulfillment center and further comprising establishing a second electronic communication channel between the computer system and a third remote site corresponding to a second one of the wireless telephone service providers to receive data in the computer system from the second one of the wireless telephone service providers.

18. A system for wireless communication device fulfillment, comprising:
    a computer including: (a) first means for maintaining inventory control over a number of wireless communication devices for a number of different wireless communication service providers, the devices being provided by different wireless communication device suppliers; (b) second means for electronically receiving ordering data from a number of ordering agents each associated with a respective one of the wireless communication service providers, the ordering agents each receiving orders from one or more customers of the respective one of the wireless communication service providers; (c) third means for providing an output signal to initiate assembly of at least one wireless communication kit including one or more of the wireless communication devices in accordance with the ordering data; and (d) fourth means for automatically reporting fulfillment status to each of the wireless communication service providers to update switching software; and
    an assembly station responsive to the output signal from said computer to provide information to assemble the at least one wireless communication kit, said assembly station including a device operable to program a unique identifier into each of the one or more wireless communication devices included in the at least one wireless communication kit.

19. The system of claim 18, further comprising a plurality of assembly stations each operatively coupled to said computer.

20. The system of claim 18, wherein said computer is configured to electronically receive wireless communication device programming information for the one or more wireless communication devices from the respective one of the wireless communication service providers.

21. The system of claim 18, wherein said assembly station includes a printer responsive to said computer to generate a document for inclusion in the wireless communication kit.

22. The system of claim 18, wherein said assembly station is further configured to selectively load an operational program into the one or more wireless communication devices.

* * * * *